United States Patent
Wang et al.

(10) Patent No.: US 7,529,422 B2
(45) Date of Patent: May 5, 2009

(54) GRADIENT-BASED IMAGE RESTORATION AND ENHANCEMENT

(75) Inventors: Hongcheng Wang, Urbana, IL (US); Yunqiang Chen, Plainsboro, NJ (US); Tong Fang, Morganville, NJ (US); Jason Jenn-Kwei Tyan, Princeton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 509 days.

(21) Appl. No.: 11/231,435

(22) Filed: Sep. 20, 2005

(65) Prior Publication Data

US 2006/0072844 A1     Apr. 6, 2006

Related U.S. Application Data

(60) Provisional application No. 60/612,104, filed on Sep. 22, 2004.

(51) Int. Cl.
    *G06K 9/40*     (2006.01)
(52) U.S. Cl. .................................................. 382/254
(58) Field of Classification Search ................. 382/254, 382/128, 260, 266, 261, 263, 274, 275
    See application file for complete search history.

(56) References Cited

U.S. PATENT DOCUMENTS

| | | | | |
|---|---|---|---|---|
| 6,055,340 | A * | 4/2000 | Nagao | 382/261 |
| 6,941,028 | B2 * | 9/2005 | Kimmel et al. | 382/274 |
| 7,085,426 | B2 * | 8/2006 | August | 382/260 |
| 7,336,848 | B2 * | 2/2008 | Sartor et al. | 382/274 |
| 7,425,985 | B2 * | 9/2008 | Kawai | 348/207.11 |
| 2003/0012448 | A1 * | 1/2003 | Kimmel et al. | 382/274 |
| 2004/0071363 | A1 * | 4/2004 | Kouri et al. | 382/276 |
| 2004/0184667 | A1 * | 9/2004 | Raskar et al. | 382/254 |
| 2004/0207881 | A1 * | 10/2004 | Nomura | 358/3.24 |
| 2005/0036689 | A1 * | 2/2005 | Mahdavieh | 382/199 |
| 2005/0089239 | A1 * | 4/2005 | Brajovic | 382/266 |

(Continued)

FOREIGN PATENT DOCUMENTS

WO    WO02082376 A2 * 10/2002

OTHER PUBLICATIONS

Antonio Robles-Kelly and Edwin R. Hancock, "An Eigenvector Method for Shape-from-shading" Proceedings of the 12th International Conference on Image Analysis and Processing (ICIAP'03) 2003, IEEE pp. 1-6.*

(Continued)

*Primary Examiner*—Samir A. Ahmed
*Assistant Examiner*—Mekonen Bekele

(57) ABSTRACT

A gradient-based image enhancement and restoration method and system which applies an orientation-isotropy adaptive filter to the gradients of high structured regions, and directly suppresses the gradients in the noise or texture regions. A new gradient field is obtained from which image reconstruction can progress using least mean squares. The method generally comprises: inputting image data; calculating image gradients; defining the gradients as having large or small coherence; filtering the large coherence gradients for edge enhancement; suppressing the small coherence gradients for noise reduction; assembling an enhanced gradient field from the filtered large coherence and suppressed small coherence gradients; and optimizing the assembled gradient field into a restored image.

11 Claims, 11 Drawing Sheets

U.S. PATENT DOCUMENTS

| | | | | |
|---|---|---|---|---|
| 2006/0039590 A1* | 2/2006 | Lachine et al. | ............. | 382/128 |
| 2006/0078181 A1* | 4/2006 | Chen et al. | ................. | 382/128 |
| 2006/0171591 A1* | 8/2006 | Chang et al. | ............... | 382/190 |
| 2007/0047788 A1* | 3/2007 | Slablaugh et al. | .......... | 382/128 |
| 2007/0098288 A1* | 5/2007 | Raskar et al. | .............. | 382/254 |
| 2007/0173744 A1* | 7/2007 | Lai et al. | .................... | 600/587 |

OTHER PUBLICATIONS

Ren'e A. Carmona and Sifen Zhong "Adaptive Smoothing Respecting Feature Directions" IEEE Transactions on Image Processing, vol. 7, No. 3, Mar. 1998, pp. 1-6.*

Ullrich Kothe, "Edge and Junction Detection with an Improved Structure Tensor" Springer-Verlag Berlin Heidelberg 2003.*

* cited by examiner

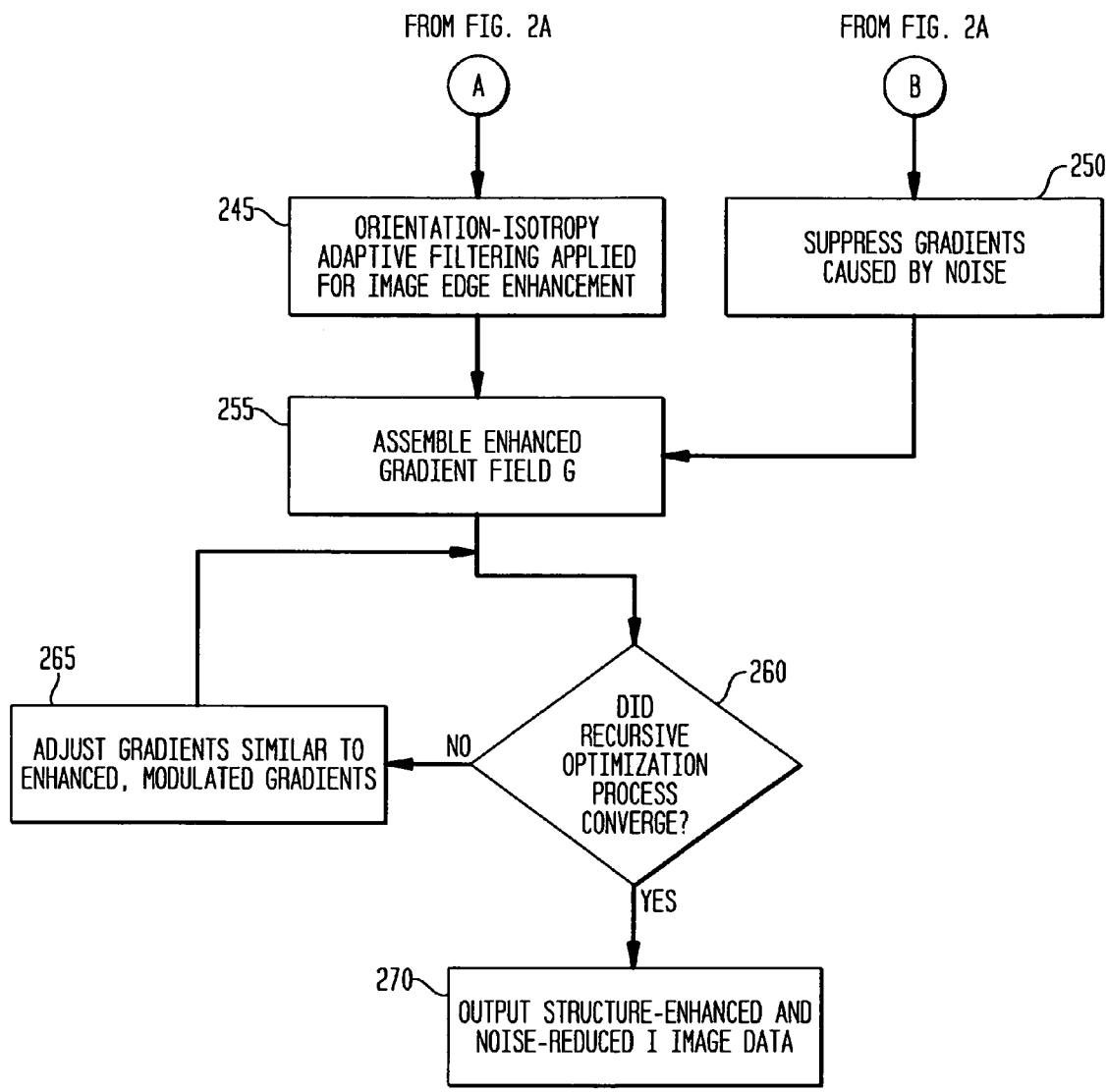

GRADIENT-BASED IMAGE RESTORATION AND ENHANCEMENT

REFERENCE TO RELATED APPLICATION

This application claims the benefit of U.S. Provisional Application No. 60/612,104, filed on Sep. 22, 2004, which is incorporated herein by reference in its entirety.

BACKGROUND

The invention relates generally to image processing, and more particularly, to methods and systems which use a gradient-based image analysis in conjunction with orientation-isotropy adaptive filtering to enhance and eliminate noise content during image feature restoration.

Almost every kind of data contains noise. Noise reduction is a required step for any sophisticated algorithm used in image processing. In medical image processing applications such as X-ray, ultrasound, magnetic resonance imaging (MRI), computed tomography (CT) and others, noise manifest during image capture, enhancement, and restoration needs to be suppressed while the original image structure is preserved. In medical imaging, image enhancement is important because it allows physicians to obtain a better visual interpretation, especially when viewing small structures (i.e. thin vessels). Moreover, enhancement is a preprocessing step for subsequent medical analysis, such as anatomy segmentation or registration of images from different modalities.

Most medical images have image quality characteristics such as contrast, sensitivity, detail (blurring), visual noise, spatial characteristics, and artifacts. Noise present in digital imaging is primarily due to the quantum noise inherent in photon detection and electronic noise. Electronic noise is relatively constant. However, quantum noise is related to the number of photons counted. Noise in an image is an undesirable, relatively high detail characteristic. Therefore, when images are processed to increase, or enhance detail, the processing also increases the visibility of the noise. When reconstructing images from data, algorithms used employ filters that impact noise in the final image. Digital image processing generally reduces noise by blurring the image creating an undesirable tradeoff.

Using CT as one example, there are several adjustable protocol factors that have an effect on image noise. Reducing voxel size, which increases detail, also increases noise because fewer protons are absorbed or captured in each voxel. Noise can be decreased by increasing the tube current—time product (mAs). However, this increases the radiation dose to the patient.

Noise is produced by the random variation, or difference, in the number of photons from one voxel to another. The statistical variation in image noise increases as the number of photons, exposure, and dose, is decreased. Small voxels, as used for better detail, capture less photons and result in more noise.

For example, if a CT slice thickness is decreased to improve image detail, the noise level will increase because of the smaller voxels. If the mAs is then increased to maintain the same noise level, the radiation dose will be increased. This is why thin CT slices are only used when necessary from a clinical perspective.

Filter algorithms can either decrease or increase noise content depending on what type is selected. Filtering is a preliminary process in many medical image processing applications. It is a fundamental operation in low-level computer vision, aiming at restoring a noise-corrupted image to its noiseless counterpart. Any post-processing tasks such as segmentation and feature enhancement benefit from noise reduction.

Diffusion equations with scalar and tensor valued diffusivities have been applied to MRIs and 3D rotational angiography (RA) for edge preserving smoothing. Magnetic resonance angiography (MRA) denoising with adaptive filtering in the Fourier domain has been proposed. Non-linear noise reduction techniques in CT imaging have also been investigated.

One adaptive filtering technique reduces the effects of partial volume averaging by resampling the data to a lattice with higher sample density thereby reducing image noise level. Resampling is achieved by constructing filter sets that have subpixel offsets relative to the original sampling lattice. The filters are also frequency corrected for anisotropic voxel dimensions. The shift and the voxel dimensions are described by an affine transform and provide a model for tuning the filter frequency functions.

Signal processing based methods, such as using a wavelet transform can be used in image denoising since the noise is evenly distributed among the wavelet coefficients and typically is small in magnitude. With a properly chosen threshold, noise can be suppressed.

The discrete wavelet transform is very efficient from the computational point of view. However, one drawback is that it is not translation invariant. Translations of the original signal lead to different wavelet coefficients.

The wavelet transform gives detailed spatial-frequency information and provides a possibility for better discrimination between noise and data. However, successful exploitation of the wavelet transform has not been achieved.

The above methods do not provide an effective balance between noise reduction and structure preservation due to the complexity of the noise statistics. At the same time, a phenomenon known as overshooting may happen near step-edge regions of an image.

Partial differential equation based methods have been attempted for use in image processing for their ability to reduce noise while preserving important features of the images. The use of linear isotropic diffusion equations equivalent to Gaussian filtering may result in edge blurring or structure relocation. Nonlinear anisotropic diffusion equations proposed by Perona and Malik rely upon the diffusion of image gray values and depend on gradient magnitude where the diffusion is stopped across edges or discontinuities. Coherence nonlinear anisotropic diffusion proposed by Weickert is more directional in both the gradient and the contour directions but may produce a brushstroke effect in the non-structure regions due to errors in local structure estimation.

While there exist various techniques for image noise reduction, an ideal filtering technique has yet to be introduced. Achieving image noise reduction has proven problematic most often due to new problems arising while undergoing operations to reduce noise content. What is desired is a method and system for removing existing noise content and obviating the introduction of new noise content during image feature enhancement.

SUMMARY OF THE INVENTION

Although there are various image enhancement methods and systems, such methods and systems are not completely satisfactory. The inventors have discovered that it would be desirable to have a gradient-based image enhancement and noise reduction restoration method and system which can preserve image edges and discontinuities and suppress noise.

The invention comprises methods and systems for image enhancement and restoration. The methods of the invention apply orientation-isotropy adaptive filtering to the gradients of high structured regions, and directly suppress the gradients in the noise (texture) low structured regions. A new gradient field is obtained from which image reconstruction can progress using least mean squares (LMS).

One aspect of the invention provides methods for image enhancement. Methods according to this aspect of the invention preferably start with inputting image data I comprising a plurality of (x, y) values, calculating image gradients for every I(x, y), defining the gradients as having large or small coherence, filtering the large coherence gradients for edge enhancement, suppressing the small coherence gradients for noise reduction, assembling an enhanced gradient field from the filtered large coherence and suppressed small coherence gradients, and optimizing the assembled gradient field into a restored image.

Another aspect of the method is performing an isotropy analysis to define whether the image gradients are large or small.

Another aspect of the invention provides systems for image enhancement. Systems according to this aspect of the invention comprise an image data input, a gradient analysis engine deriving gradients for image input data and having an input coupled to the image data input and an output, a structure coherence analysis engine having an input coupled to the gradient analysis engine output and having a large coherence gradient and small coherence gradient output, an adaptive filter having an input coupled to the large coherence gradient output and an output, a suppressor having an input coupled to the small coherence gradient output and an output, an assembler for assembling an enhanced gradient field having a filter input coupled to the filter output and a suppressor input coupled to the suppressor output and an output, and a recursive optimizer having an input coupled to the assembler output for adjusting the image gradients to the enhanced gradient field enhancing structure and reducing noise content.

These and other advantages of the invention will be apparent to those of ordinary skill in the art by reference to the following detailed description and the accompanying drawings.

BRIEF DESCRIPTION OF THE DRAWINGS

FIGS. 2a and 2b is a block diagram of an exemplary method according to an embodiment of the invention.

FIG. 4b shows an exemplary structure coherence analysis (top), orientation analysis (middle), and isotropy analysis (bottom) of the original image of FIG. 4a.

FIG. 4c shows an exemplary estimated gradient field analysis (top) and an image reconstruction of the original image of FIG. 4a.

FIG. 6b shows an exemplary coherence enhancing diffusion of the image of FIG. 6a.

FIG. 6c shows an exemplary nonlinear diffusion of the image of FIG. 6a.

DETAILED DESCRIPTION OF THE PREFERRED EMBODIMENTS

Figure 1A:
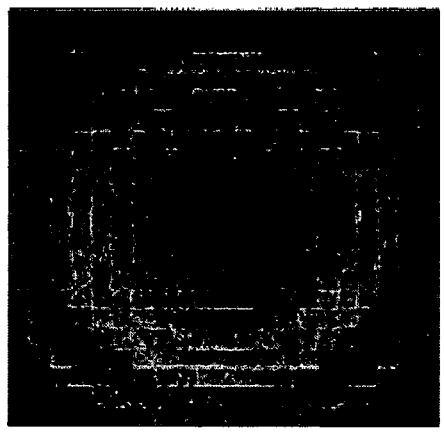
FIG. 1a shows an image of an orientation-isotropy kernel having σ=4.

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings.

It should be noted that the invention is not limited to any particular software language described or implied in the figures. One of ordinary skill in the art will understand that a variety of alternative software languages may be used for implementation of the invention. It should also be understood that some components and items are illustrated and described as if they were hardware elements, as is common practice within the art. However, one of ordinary skill in the art, and based on a reading of the detailed description would understand that in at least one embodiment, components in the method and system may be implemented in software or hardware.

The invention is an image feature enhancement and restoration method and system based in the gradient domain. Local structure properties such as coherence and orientation are estimated based on the gradient structure tensor. In high structured, anisotropic regions exhibiting high coherence, an orientation-isotropy adaptive Gaussian filter is applied to the gradient field. In low structured, isotropic texture regions exhibiting low coherence, the gradient field is suppressed. A non-integrable gradient field is determined from which reconstruction of the image is obtained by solving a second-order, partial differential Poisson equation. The invention obviates image overshooting near image element edges and brushstroke effects in non-structured regions since the method does not force structure onto regions that have none by direct suppression of the gradients in those regions.

The invention is a modular framework and can be deployed as software as an application program tangibly embodied on a program storage device for execution on a computer (not shown), as hardware, as firmware, or any combination thereof. The application code for execution can reside on a plurality of different types of computer readable media known to those skilled in the art. The application can be accessed through a graphical user interface (GUI). Users can access the framework by accessing the GUI via a computer.

Figure 2A:
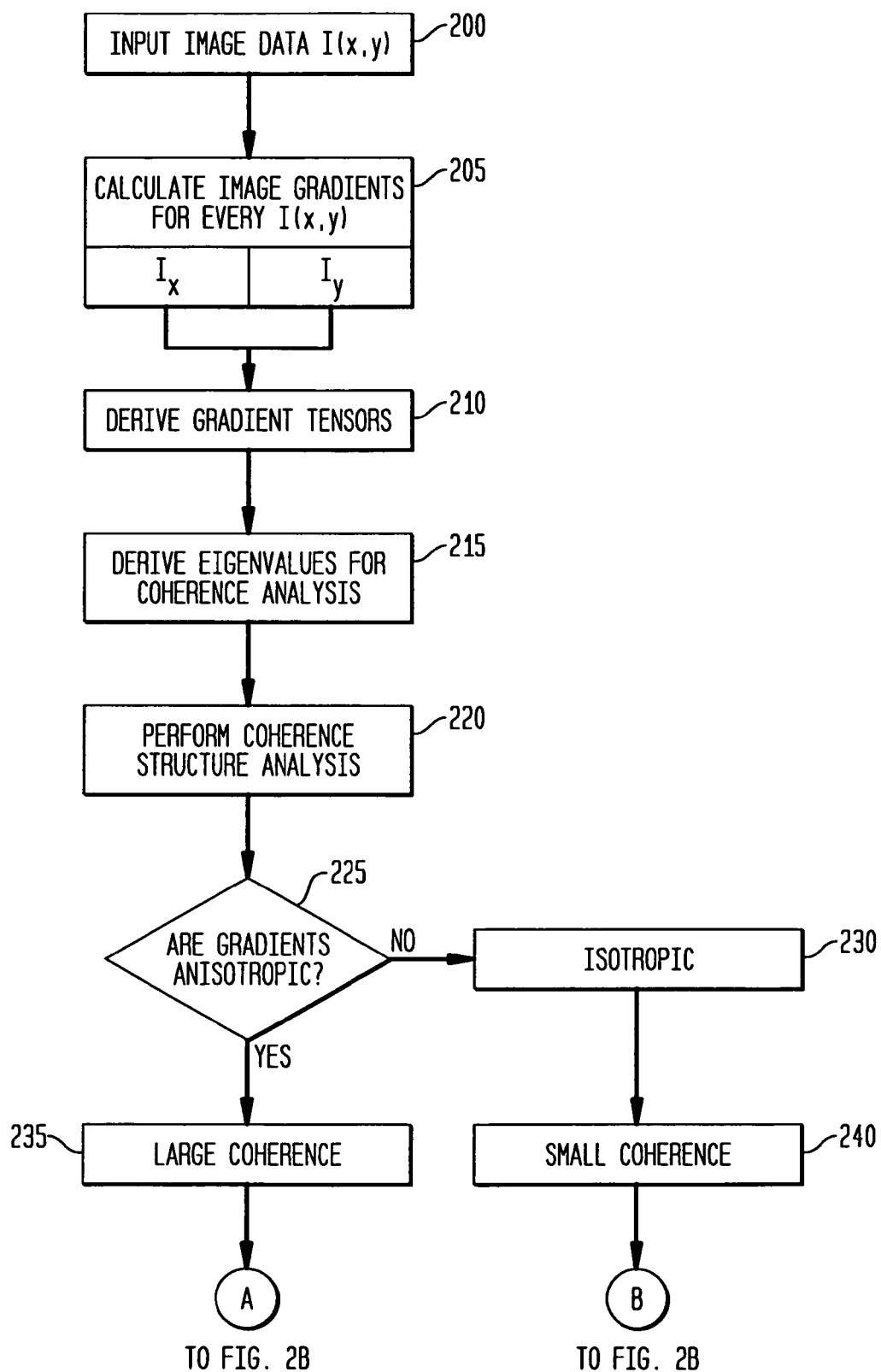
Figure 3:
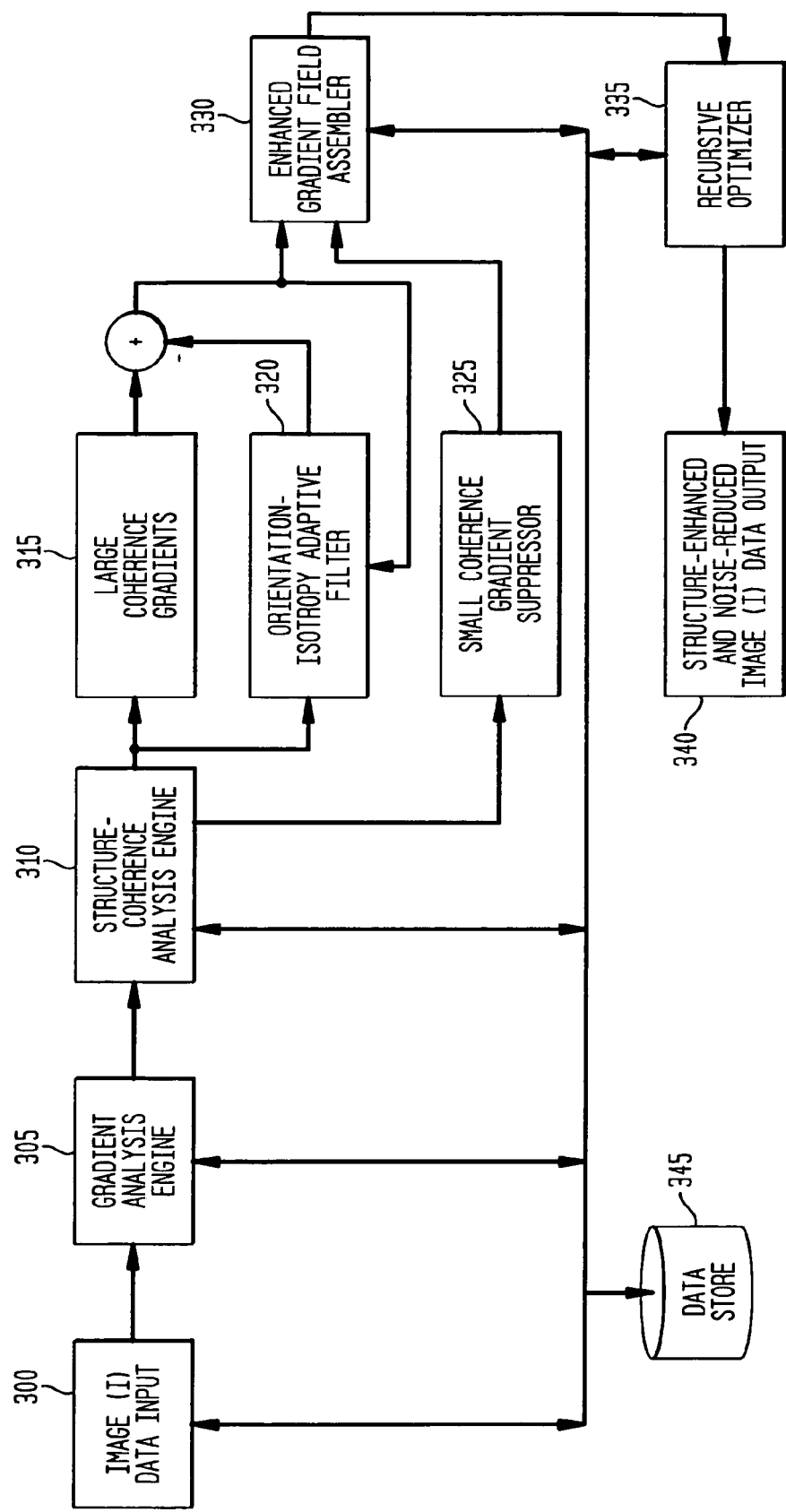
FIG. 3 is an exemplary framework of the individual modules of the invention.
Figure 4A:
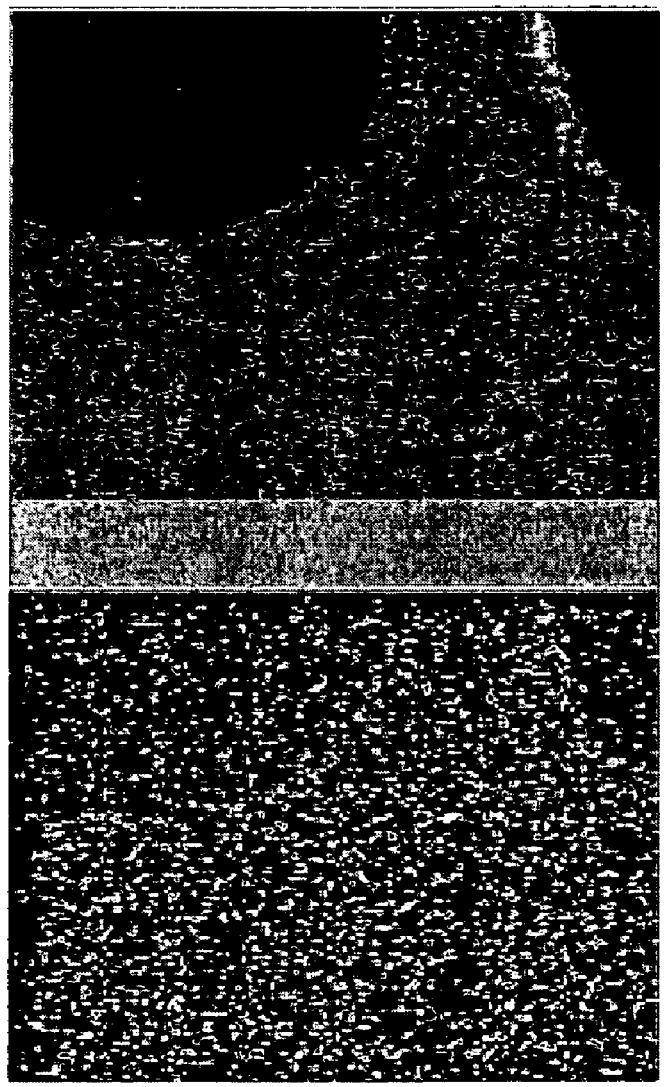
FIG. 4a shows an original noisy image (top) and an exemplary, corresponding gradient analysis (bottom).
Figure 4B:
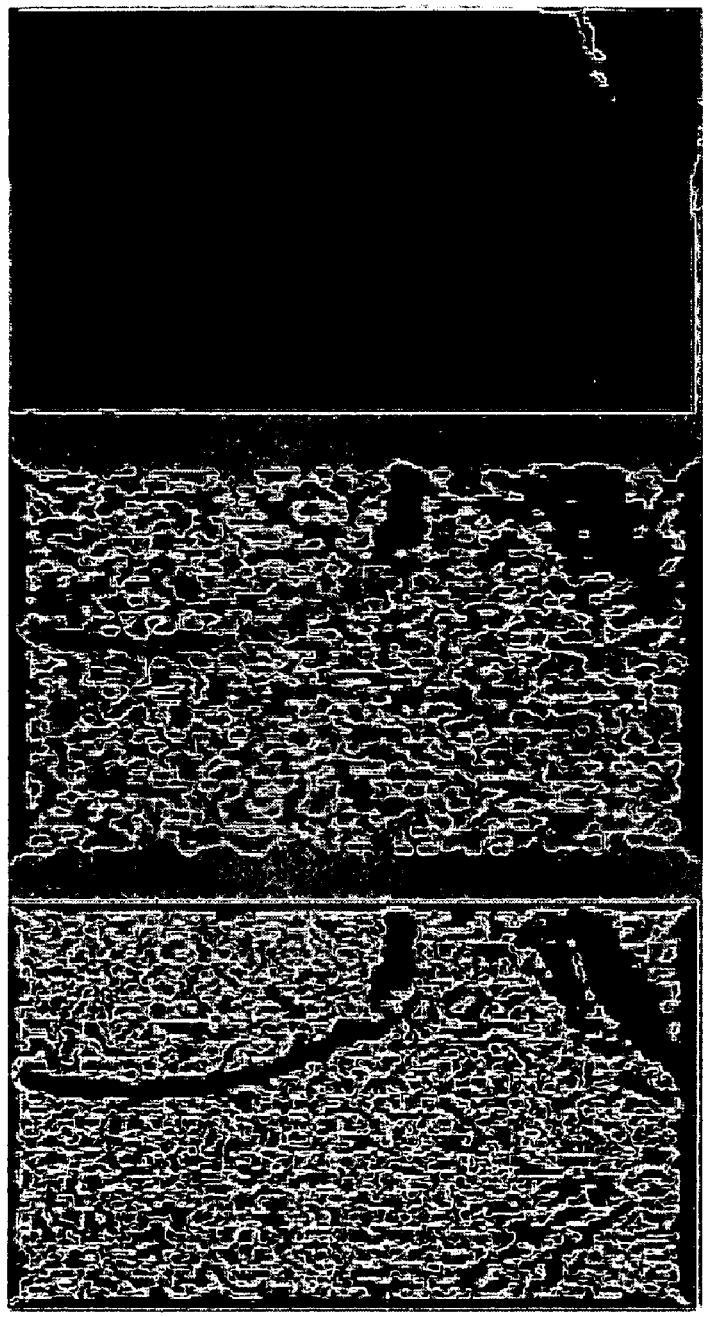
Figure 4C:
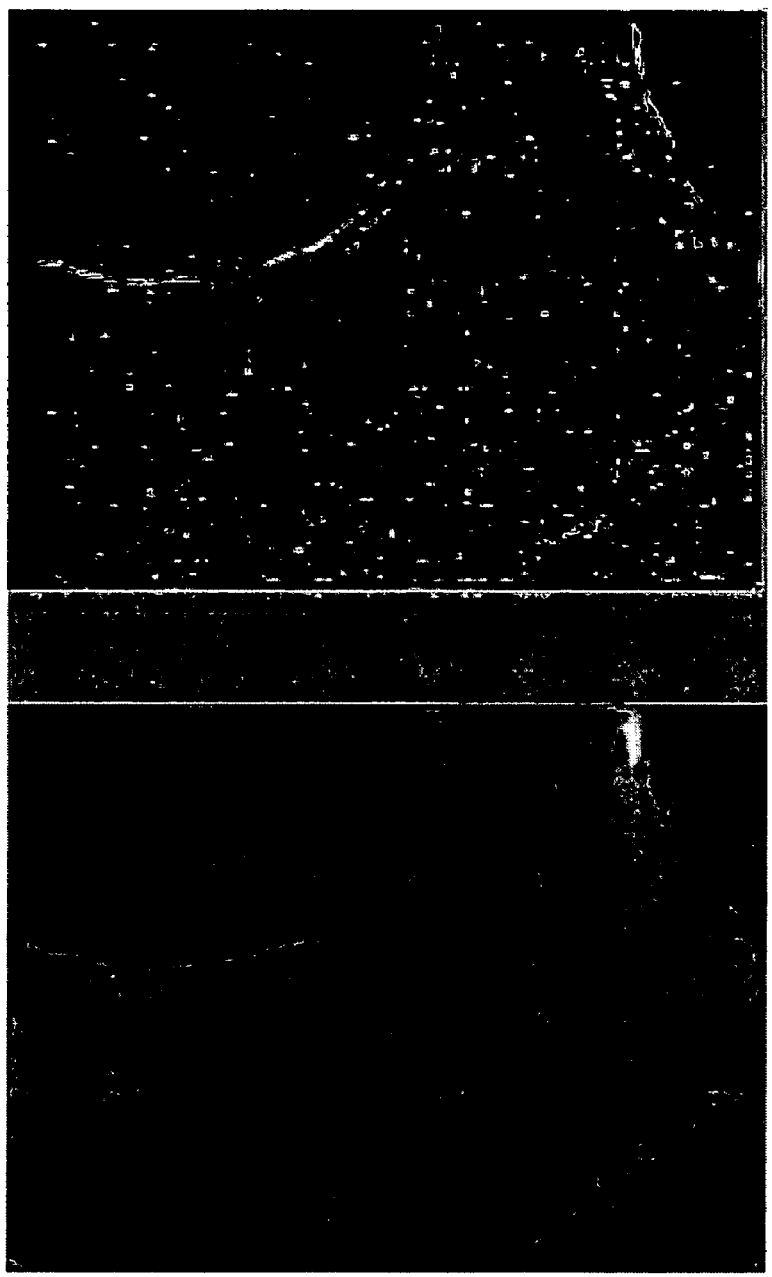
Figure 5A:
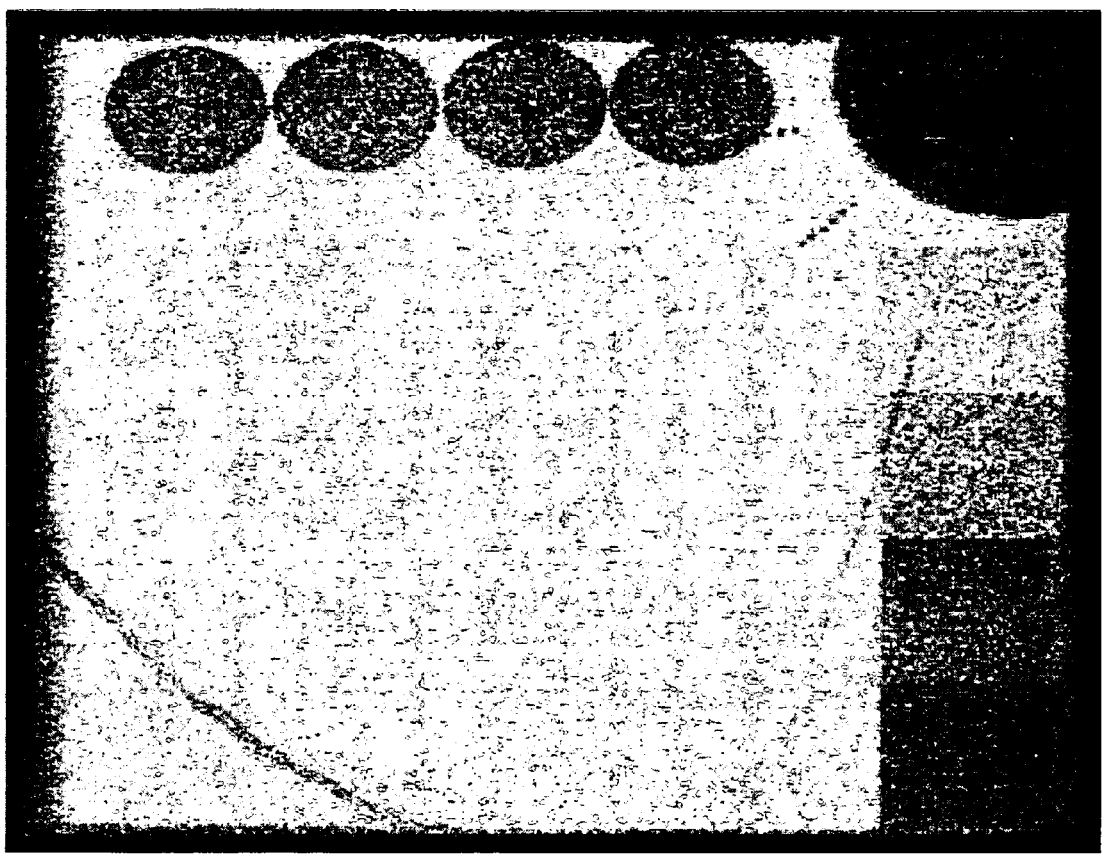
FIG. 5a shows an original noisy x-ray image.
Figure 5B:
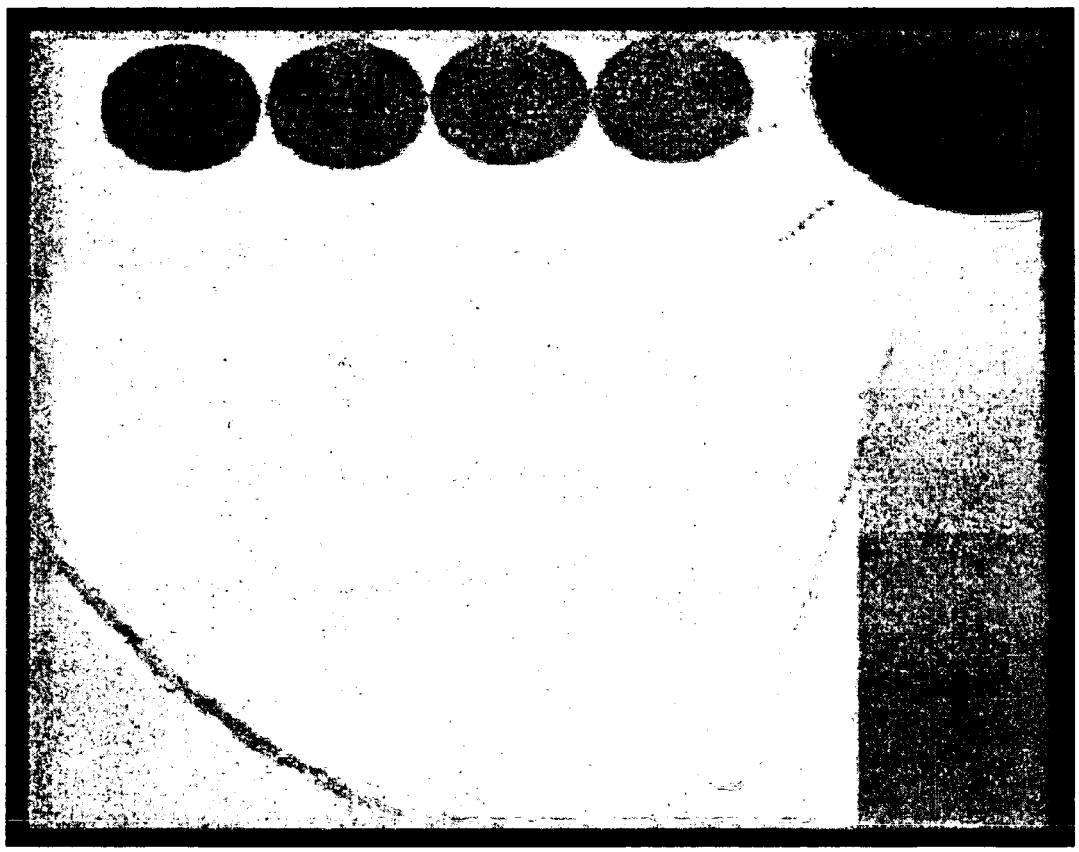
FIG. 5b shows an exemplary reconstruction of the image of FIG. 5a using the gradient-based image restoration method according to an embodiment of the invention.
Figure 6A:
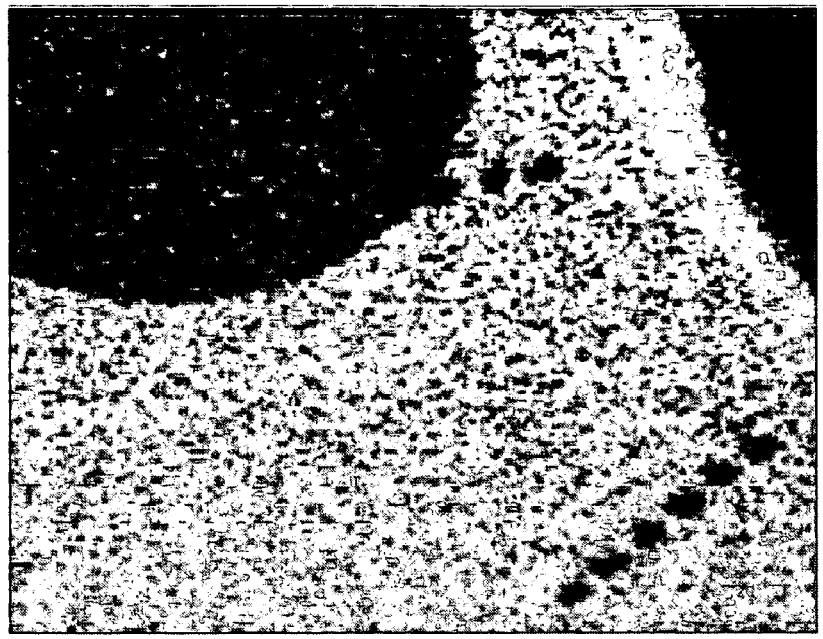
FIG. 6a shows an original noisy x-ray image.
Figure 6B:
Figure 6C:
Figure 6D:
FIG. 6d shows an exemplary reconstruction of the image of FIG. 6a using the gradient-based image restoration method according to an embodiment of the invention.

Shown in FIGS. 2a and 2b is a flowchart of a method for gradient-based image enhancement and restoration according to one embodiment of the invention. Shown in FIG. 3 is a corresponding framework of the various modules that comprise the invention as executed by a computer, or processed by hardware. The invention framework allows effective integration of image data and shows data flow through a set of coupled modules comprising the invention. The modules include an image data input 300, a gradient analysis engine 305, a structure coherence engine 310, a large coherence gradient store 315, an orientation-isotropy adaptive filter 320, a small coherence gradient magnitude suppressor 325, an enhanced gradient field assembler 330, a recursive optimizer 335, an image data output 340, and a data store 345. Empirical processing results are shown in FIGS. 4a-d.

The invention performs a coherent structure analysis on a given 2D image I(x, y) 300 (step 200) using the gradient structure tensor. The structure tensor is based on the gradient of I defined as $$T = \overline{\left(\frac{xx^T}{\|x\|^n}\right)} \quad (1)$$

where $\overline{()}$ indicates a weighted local average. The structure tensor is used for local coherence estimation. An efficient implementation of the structure tensor is the gradient structure tensor which is estimated.

There are two gradient images, a gradient $I_x$ in the x-direction and a gradient $I_y$ in the y- direction. The method of the invention performs the same operations on both $I_x$, $I_y$ gradients (step 205).

The gradient $g = \nabla I$ is first estimated at scale $\sigma_g$ with $\sigma_g$ representing the standard deviation. The gradients are computed 305 (step 205) by convolving the image with first order Gaussian derivative filters.

$$g_i = I(x) \otimes \frac{\partial}{\partial x_i} G(x; \sigma_g), i \in (1, \ldots, N) \quad (2)$$

where $\otimes$ denotes convolution and $G_x$ are spatial derivatives in the x- direction (y- direction operations omitted for clarity) of a Gaussian with a standard deviation $\sigma$. The gradient structure tensor is defined by $$T \equiv \overline{gg^T} \quad (3)$$

In image processing, a structure tensor defined for a 2D neighborhood, I(x, y), is obtained by calculating at each point of the image the Cartesian product of the gradient vector $I_x$, $I_y$ with itself (step 210).

$$T = \begin{bmatrix} I_{11} & I_{12} \\ I_{12} & I_{22} \end{bmatrix}, \quad g = \begin{bmatrix} I_x \\ I_y \end{bmatrix}, \quad I_{11} = \overline{I_x^2}, I_{12} = \overline{I_x I_y}, I_{22} = \overline{I_y^2} \quad (4)$$

Eigenvalues of the above matrix can be computed (step 215)

$$\lambda_{1,2} = (I_{11} + I_{22} \pm \sqrt{(I_{11} - I_{22})^2 + 4I_{12}^2})/2 \quad (5)$$

with $\lambda_1 \geq \lambda_2$. The corresponding eigenvectors are determined by $$e_1 \left\| \left( I_{22} - I_{11} + \sqrt[2/12]{(I_{11} - I_{22})^2 + 4I_{12}^2} \right) \right. \quad (6)$$

The eigenvectors correspond to the directions of maximum and minimum variations. Properties that are obtained from the gradient structure tensor are anisotropy, coherence, and orientation 310 (step 220).

Anisotropy, or confidence $\alpha$, is the measure of the structure orientation defined as $$\alpha = (\lambda_1 - \lambda_2)/(\lambda_1 + \lambda_2) \quad (7)$$

If the Eigenvalues $\lambda_1$, $\lambda_2$ satisfy $\lambda_1 \approx \lambda_2$, then $\alpha \approx 0$ and the structure is isotropic (step 230). If $\lambda_1$, $\lambda_2$ satisfy $\lambda_1 \gg \lambda_2$, then $\alpha \approx 1$ and the structure is linear or anisotropic (step 225).

Coherence, or local structure C, is estimated from $\lambda_1$ and $\lambda_2$. Homogeneous regions are characterized by $\lambda_1 = \lambda_2 \approx 0$, edges by $\lambda_1 \gg \lambda_2 \approx 0$, and corners by $\lambda_1 \geq \lambda_2 \gg 0$. Structure coherence measures the coherence within a window defined by $$C = |\lambda_1 - \lambda_2| = \sqrt{(I_{11} - I_{22})^2 + 4I_{12}^2} \quad (8)$$

Orientation, $\theta$, is the second eigenvector of T and defines the coherence orientation since it corresponds to the direction with the lowest fluctuations $$\theta = \arctan(2I_{12}/(I_{22} - I_{11} + C)) \quad (9)$$

The above three parameters are used for orientation-isotropy adaptive filtering in accordance with the teachings of the invention.

An orientation-isotropy adaptive filter for image restoration based on the structure coherence orientation and isotropy estimated above is described estimating the filter kernel for the pixels whose coherence is large (step 235) instead of each and every pixel since regions with small coherence (step 240) are usually texture or noise regions. The gradients caused by noise can be suppressed in these regions 325 (step 250).

Rather than using grey values of images, the orientation-isotropy adaptive filtering 315, 320 (step 245) is performed on the large coherence gradient field for image edge enhancement and can obtain a continuous surface in a later image reconstruction process.

An adaptive filter 320 adjusts its coefficients to minimize the mean-square error between its output and that of an unknown system 315. The objective is to change (adapt) the coefficients of an FIR filter 320 to match as closely as possible the response of the unknown system 315. The unknown system 320 and the adapting filter 320 process the same input signal which in this instance is a gradient field and output a desired signal. The adaptive filter 320 is adapted using the LMS algorithm. First an error signal is computed which measures the difference between the output of the adaptive filter 320 and the output of the unknown system 315. On the basis of this measure, the adaptive filter 320 will change its coefficients in an attempt to reduce the error.

Figure 1B:
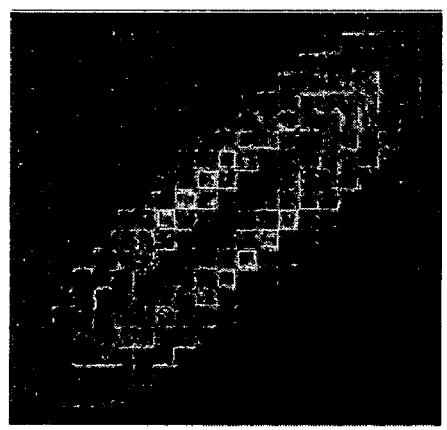
FIG. 1b shows an image of an orientation-isotropy kernel having $$\sigma_1 = 1, \quad \sigma_2 = 4, \quad \text{and } \theta = \frac{\pi}{4}.$$

The new gradient field 330 (step 255) is obtained by $$g_i' = \begin{cases} g_i \otimes G(\sigma_1, \sigma_2, \theta), & \text{for } C < C_{thres} \quad (10) \\ \beta \cdot g_i, & \text{for } C \geq C_{thres} \quad (11) \end{cases}$$

where $C_{thres}$ is the threshold value for coherence. $G(\sigma_1, \sigma_2, \theta)$ is the orientation-isotropy kernel with $\sigma_1$ and $\sigma_2$ defined by $$\sigma_1 = \sigma_{min} + (1 - \alpha)(\sigma_{iso} - \sigma_{min}), \sigma_2 = \sigma_{iso}^2/\sigma_1 \quad (12)$$

where the minimum scale for the minor axis, $\sigma_{min}$, is defined for preventing $\sigma_2$ becoming zero. When $\alpha=0$, the normal Gaussian kernel is defined with $\sigma=\sigma_{iso}$. FIGS. 1a and 1b illustrate kernels displaying different orientation and isotropy.

Having derived an enhanced gradient field G, an image I, is reconstructed whose gradient field is closest to G. The reconstruction is performed using $\nabla I=G$. However, since the new, enhanced gradient field is not necessarily integrable, some part of the modified gradient may violate $\nabla \times G=0$ (i.e. the curl of the gradient is 0). In such a case, a potential function I must be derived whose gradients are closest to G in the sense of least squares by searching the space of all 2D potential functions. That is, to minimize the following integral in 2D space, $$f = \min \int \int \int F(\nabla I, G)\, dxdy \text{ where} \qquad (13)$$

$$F(\nabla I, G) = \|\nabla I - G\|^2 = \left(\frac{\partial I}{\partial x} - G_x\right)^2 + \left(\frac{\partial I}{\partial y} - G_y\right)^2 \qquad (14)$$

According to the Variational Principle, a function F that minimizes the integral must satisfy the Euler-Lagrange equation $$\frac{\partial F}{\partial I} - \frac{d}{dx}\frac{\partial F}{\partial I_x} - \frac{d}{dy}\frac{\partial F}{\partial I_y} = 0 \qquad (15)$$

We can then derive a second-order partial differential 3D Poisson equation.

$$\nabla^2 I = \nabla \cdot G \qquad (16)$$

In order to solve the Poisson equation (16), if G=0, it reduces to Laplace's equation. A function G which satisfies Laplace's equation is defined as harmonic. A solution to Laplace's equation has the property that the average value over a spherical surface is equal to the value at the center of the sphere. Solutions have no local maxima or minima. Because Laplace's equation is linear, the superposition of any two solutions is also a solution. A solution to Laplace's equation is uniquely determined if the value of the function is specified on all boundaries—Dirichlet boundary conditions, or the normal derivative of the function is specified on all boundaries—Neumann boundary conditions.

Neumann boundary conditions $\nabla I \cdot \vec{n} = 0$ are used where $\vec{n}$ is the normal on the boundary $\Omega$.

The intensity gradients are approximated by forward difference $$\nabla I = [I(x+1,y) - I(x,y), I(x,y+1) - I(x,y)]^T \qquad (17)$$

The Laplacian is represented as $$\nabla^2 I = [-6 \cdot I(x,y) + I(x-1,y) + I(x+1,y) + I(x,y+1)] \qquad (18)$$

The divergence of the gradient is approximated as $$\nabla \cdot G = G_x(x,y) - G_x(x-1,y) + G_y(x,y) - G_y(x,y-1) \qquad (19)$$

This results in a large system of linear equations. 2D multigrid algorithms are used to iteratively find the optimal solution to minimize Equation 10 335 (steps 260, 265). When the gradients are similar to the modulated gradient images, the optimization process stops, reconstructing a structure-enhanced and noise-reduced image 340 (step 270).

FIGS. 5a and 5b, and 6a-d show experimental results obtained using the method and system of the invention. The image structures, edges and other discontinuities are preserved and the noise is suppressed.

If the noise is totally suppressed in the texture regions, the image will look unnatural for clinical practice. Therefore, $\beta=0.5$ in Equation 11. Other parameters used in this series of reconstructions are $C_{thres}=100$, $\sigma_{min}=0.2$, and $\sigma_{iso}=2$. Compared with prior art image enhancement algorithms such as coherence enhancing diffusion and edge-preserving nonlinear diffusion algorithms, the gradient-based method preserves edges and suppresses noises at the same time. For the coherence enhancing diffusion study, $\sigma$ was set at 2. The brushstroke effect results in the texture regions. For edge-preserving nonlinear diffusion, the filtered image has very flat regions, which look very unnatural for physicians in clinical practice (note that some details are missing the upper-right region).

The invention provides a gradient-based image enhancement and noise reduction restoration method and system which can preserve image edges and discontinuities and suppress noise. The method of the invention applies orientation-isotropy adaptive filter to the gradients of high structured regions, and directly suppress the gradients in the noise or texture regions. A new gradient field is obtained from which image reconstruction can progress using least mean squares. The results show the method is effective in image processing.

Although the invention herein has been described with reference to particular embodiments, it is to be understood that these embodiments are merely illustrative of the principles and applications of the present invention. Moreover, although hardware or software have been used to implement certain functions described in the present invention, it will be understood by those skilled in the art that such functions may be performed using hardware, software or a combination of hardware and software. It is therefore to be understood that numerous modifications may be made to the illustrative embodiments and that other arrangements may be devised without departing from the spirit and scope of the present invention as defined by the appended claims.

What is claimed is:

1. A method for image enhancement comprising:
   inputting image data comprising a plurality of pixel values;
   using a computer to perform the steps of
   calculating image gradient vectors for every image pixel value;
   defining a structure tensor for a 2D neighborhood by calculating. for each image pixel, a Cartesian product of each gradient vector with itself;
   computing eigenvectors for the structure tensor;
   identifying an anisotropic region as a region where the eigenvectors are approximately equal;
   identifying an isotropic region as a region where the eigenvectors are not approximately equal;
   filtering the anisotropic region of the image data for edge enhancement;
   suppressing the isotropic region of the image data for noise reduction;
   assembling an enhanced gradient field from the filtered anisotropic region and suppressed isotropic region gradients; and
   optimizing the assembled gradient field into a restored image.

2. The method according to claim 1, wherein identifying the anisotropic region and the texture region of the image data based on the size of the coherence value includes performing an isotropy analysis.

3. The method according to claim 2, wherein the filtering is performed using an orientation-isotropy adaptive filter applied for image edge enhancement.

4. The method according to claim 3, wherein the optimizing further comprises comparing the image gradients to the enhanced gradients and stopping the optimizing when the gradient comparisons are similar.

5. The method according to claim 4, further comprising outputting a reconstructed, structure-enhanced and noise-reduced image.

6. A system for image enhancement comprising:
an inputting unit inputting image data comprising a plurality of pixel values;
a calculating unit calculating image gradient vectors for every image pixel value;
a defining unit defining a stru inre tensor for a 2D neighborhood by calculating, for each image pixel, a Cartesian product of each gradient vector with itself;
a computing unit computing eigenvectors for the structure tensor;
an identifying unit for identifying an anisotropic region as a region where the eigenvectors are approximately equal and identifying an isotropic region as a region where the eigenvectors are not approximately equal;
a filtering unit filtering the anisotropic region for edge enhancement;
a suppressing unit suppressing the isotropic region for noise reduction;
an assembling unit assembling an enhanced gradient field from the filtered anisotropic region and suppressed isotropic region gradients; and
an image restoring unit optimizing the assembled gradient field into a restored image and outputting the restored image.

7. The system according to claim 6, wherein the identifying unit uses an isotropy analysis unit performing an isotropy analysis.

8. The system according to claim 7, wherein the filtering unit performs filtering using an orientation-isotropy adaptive filter applied for image edge enhancement.

9. The system according to claim 8, wherein the image restoring unit optimizes the assembled gradient field using a comparing unit comparing the image gradients to the enhanced gradients and stopping the optimizing when the gradient comparisons are similar.

10. The system according to claim 9, wherein the image restoring unit includes an output unit outputting a reconstructed, structure-enhanced and noise-reduced image as the restored image.

11. A system for image enhancement comprising:
an image data input unit receiving image data;
a gradient analysis engine deriving gradients for the received image data;
a tensor definition unit defining a structure tensor for a 2D neighborhood by calculating. for each image pixel, a Cartesian product of each gradient vector with itself;
an eigenvector computing unit computing eigenvectors for the structure tensor;
a structure coherence analysis engine receiving the derived gradients from the gradient analyis engine and identifying a anisotropic region as a region where the eigenvectors are approximately and identifying an isotropic region as a region where the eigenvectors are not approximately equal;
an adaptive filter filtering the anisotropic region of the image data for edge enhancement;
a suppressor suppressing the isotropic region of the image data for noise reduction;
an assembler for assembling an enhanced gradient field from the filtered anisotropic region gradient and the suppressed isotropic region gradient;
a recursive optimizer adjusting the image gradients to the assembled enhanced gradient field and reducing noise content of the image gradients; and
an image output unit for outputting the optimized and noise reduced image gradients.

* * * * *